United States Patent
Mital et al.

(10) Patent No.: US 9,794,290 B2
(45) Date of Patent: *Oct. 17, 2017

(54) QUANTITATIVE SECURITY IMPROVEMENT SYSTEM BASED ON CROWDSOURCING

(71) Applicant: Symantec Corporation, Mountain View, CA (US)

(72) Inventors: Amit Mital, Seattle, WA (US); Carey S Nachenberg, Manhattan Beach, CA (US); Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/690,340

(22) Filed: Apr. 17, 2015

(65) Prior Publication Data

US 2016/0255115 A1 Sep. 1, 2016

Related U.S. Application Data

(63) Continuation-in-part of application No. 14/632,812, filed on Feb. 26, 2015.

(51) Int. Cl.
*H04L 9/00* (2006.01)
*H04L 29/06* (2006.01)

(52) U.S. Cl.
CPC .......... *H04L 63/20* (2013.01); *H04L 63/1433* (2013.01)

(58) Field of Classification Search
CPC ... H04L 63/20; H04L 63/302; H04L 63/1416; H04L 63/1433; G06F 21/577; G06F 21/50; G06F 21/55; G06F 21/56; G06F 21/70

(Continued)

(56) References Cited

U.S. PATENT DOCUMENTS 6,807,569 B1 10/2004 Bhimani et al.
7,339,914 B2 * 3/2008 Bhagwat .................. 370/338

(Continued)

FOREIGN PATENT DOCUMENTS

WO 2005/124622 A2 12/2005

OTHER PUBLICATIONS

Johnson et al. "Guide to Cyber Threat Information Sharing (Draft)." In: NIST Special Publication 800-150. Oct. 29, 2014 (Oct. 29, 2014). Retrieved from <http://csrc.nist.gov/publications/drafts/800-150/sp800_150 draft.pdf>.

(Continued)

*Primary Examiner* — Hosuk Song
(74) *Attorney, Agent, or Firm* — Patent Law Works LLP

(57) ABSTRACT

The efficacy of security products and practices is quantified, based on monitored activities and conditions on multiple computers over time. A set of metrics is defined, specifying what criteria concerning computer security systems are to be quantified. Telemetry data concerning the defined metrics are collected from multiple computers, such as the customer base of a security product vendor. Security configuration information such as the deployments and settings of security systems on computing devices is monitored. This monitored information tracks what security products are deployed on which machines, and how these products are configured and used. Collected telemetry is correlated with monitored configuration information, enabling determination of what security product deployments and settings are in place when specific security incidents, operations and other types of actions occur. The determined correlations are amalgamated, amalgamated correlation information is analyzed, and the efficacy of specific security products and configurations is quantified.

20 Claims, 3 Drawing Sheets

(58) Field of Classification Search
USPC .................. 726/1, 22–26; 709/223–225
See application file for complete search history.

(56) References Cited

U.S. PATENT DOCUMENTS

| | | | |
|---|---|---|---|
| 7,536,723 B1* | 5/2009 | Bhagwat | H04L 12/2602 |
| | | | 726/22 |
| 8,091,114 B2* | 1/2012 | Lommock | G06F 21/55 |
| | | | 340/425.5 |
| 8,353,021 B1 | 1/2013 | Satish et al. | |
| 8,516,552 B2* | 8/2013 | Raleigh | G06Q 10/06375 |
| | | | 370/235 |
| 8,595,831 B2* | 11/2013 | Skare | G05B 23/0267 |
| | | | 434/118 |
| 8,683,598 B1 | 3/2014 | Cashin | |
| 8,769,696 B2 | 7/2014 | Pistoia et al. | |
| 8,789,200 B2 | 7/2014 | An et al. | |
| 9,009,827 B1 | 4/2015 | Albertson et al. | |
| 9,015,843 B2* | 4/2015 | Griffin | G06F 21/56 |
| | | | 726/23 |
| 9,043,922 B1* | 5/2015 | Dumitras | G06F 21/577 |
| | | | 726/25 |
| 9,064,130 B1 | 6/2015 | Asheghian et al. | |
| 9,275,237 B2 | 3/2016 | De Cristofaro et al. | |
| 2004/0109255 A1 | 6/2004 | Walz | |
| 2004/0210763 A1 | 10/2004 | Jonas | |
| 2005/0102534 A1 | 5/2005 | Wong | |
| 2007/0240220 A1 | 10/2007 | Tuvell et al. | |
| 2008/0109473 A1 | 5/2008 | Dixon et al. | |
| 2008/0133531 A1 | 6/2008 | Baskerville et al. | |
| 2008/0271124 A1 | 10/2008 | Nisbet et al. | |
| 2010/0082803 A1 | 4/2010 | Nguyen | |
| 2011/0055925 A1 | 3/2011 | Jakobsson | |
| 2014/0373162 A1 | 12/2014 | Mahaffey et al. | |
| 2015/0244681 A1 | 8/2015 | Blumenfeld et al. | |
| 2015/0373040 A1 | 12/2015 | Sander et al. | |

OTHER PUBLICATIONS

International Search Report and Written Opinion for PCT/US2016/016752, dated Apr. 28, 2016, 11 pages.
International Search Report and Written Opinion for PCT/US2016/027937, dated Jul. 15, 2016, 10 pages.
Lincoln et al., "Privacy-Preserving Sharing and Correlation of Security Alerts," USENIX, 2004, 16 pages.

* cited by examiner

QUANTITATIVE SECURITY IMPROVEMENT SYSTEM BASED ON CROWDSOURCING

PRIORITY CLAIM

This patent application is a Continuation In Part of pending U.S. patent application Ser. No. 14/632,812, titled "Trusted Third Party Broker for Collection and Private Sharing of Successful Computer Security Practices," which was filed on Feb. 26, 2015 and has the same assignee (the "Parent Application"). The Parent Application is incorporated herein by reference in its entirety.

TECHNICAL FIELD

This disclosure pertains generally to computer security, and more specifically to quantifying the efficacy of security products and practices, based on telemetry data collected from a plurality of computer systems.

BACKGROUND

Contemporary computer security software packages have many features and configuration options. Users at both the enterprise and individual level frequently do not know how to effectively configure their security products, and have no hard quantitative data about the efficacy of different features or settings. Instead, customers deploy security software products of unknown effectiveness, and either use default settings or attempt to configure the numerous options with limited or no understanding of the implications.

A similar issue applies to vendors of security software. They instruct potential customers to deploy specific products and activate certain features, promising better protection against malicious activity once having done so. However, the vendors do not have any proof or quantification of the benefits provided by the systems they are selling. Instead, customers must take the vendors word that the product is effective. This makes sales far more difficult.

It would be desirable to address these issues.

SUMMARY

The efficacy of security products and practices is quantified, based on monitored activities and conditions on multiple computing devices over time. More specifically, a set of metrics is defined, specifying what criteria concerning computer security systems are to be measured and quantified. This can include, for example, positive and negative computer security incidents, as well factors such as user time spent administering security products or the frequency with which defaults settings or actions are overridden. Telemetry data concerning the defined metrics are collected from across a plurality of computers, such as the customer base of a security product vendor, a subset of the customer base, the computers within a given organization (or department) etc. The telemetry data in question can be in the form of data that explicitly or implicitly concerns the metrics being quantified, at any level of granularity. Security configuration information such as the deployments and settings of security systems on computing devices is monitored. This monitored information tracks what security products are deployed on which machines, and how these products are configured (e.g., which options are enabled, which settings are selected, etc.).

Collected telemetry is correlated with monitored configuration information. This enables automatic determination of what security product deployments and settings are in place (as tracked per the monitored configuration information) when specific security incidents, operations and other types of actions (good and bad) occur under given circumstances (as tracked per the collected telemetry). The determined correlations are amalgamated, which has the effect of maintaining a current collection of correlation information concerning what security product deployments and settings are in place under what circumstances as multiple measured security incidents and/or other security related activities occur on multiple computer systems over time. The amalgamated correlation information concerning the deployments, system settings and other circumstances under which security incidents and/or other security related activities occur is analyzed. The efficacy of specific security products and configurations is quantified, based on the ongoing analysis of this correlation information as computer security products are deployed on different monitored computer systems and the settings and configurations are adjusted and modified. The resulting quantifications can be used in a number of ways, such to make recommendations to security product users concerning changes to be made to their current settings, configurations, deployments and the like, backed up by specific hard data. Other possible uses are in the context of sales and/or marketing tools, and computer security insurance actuarial calculations.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DESCRIPTION

Figure 1:
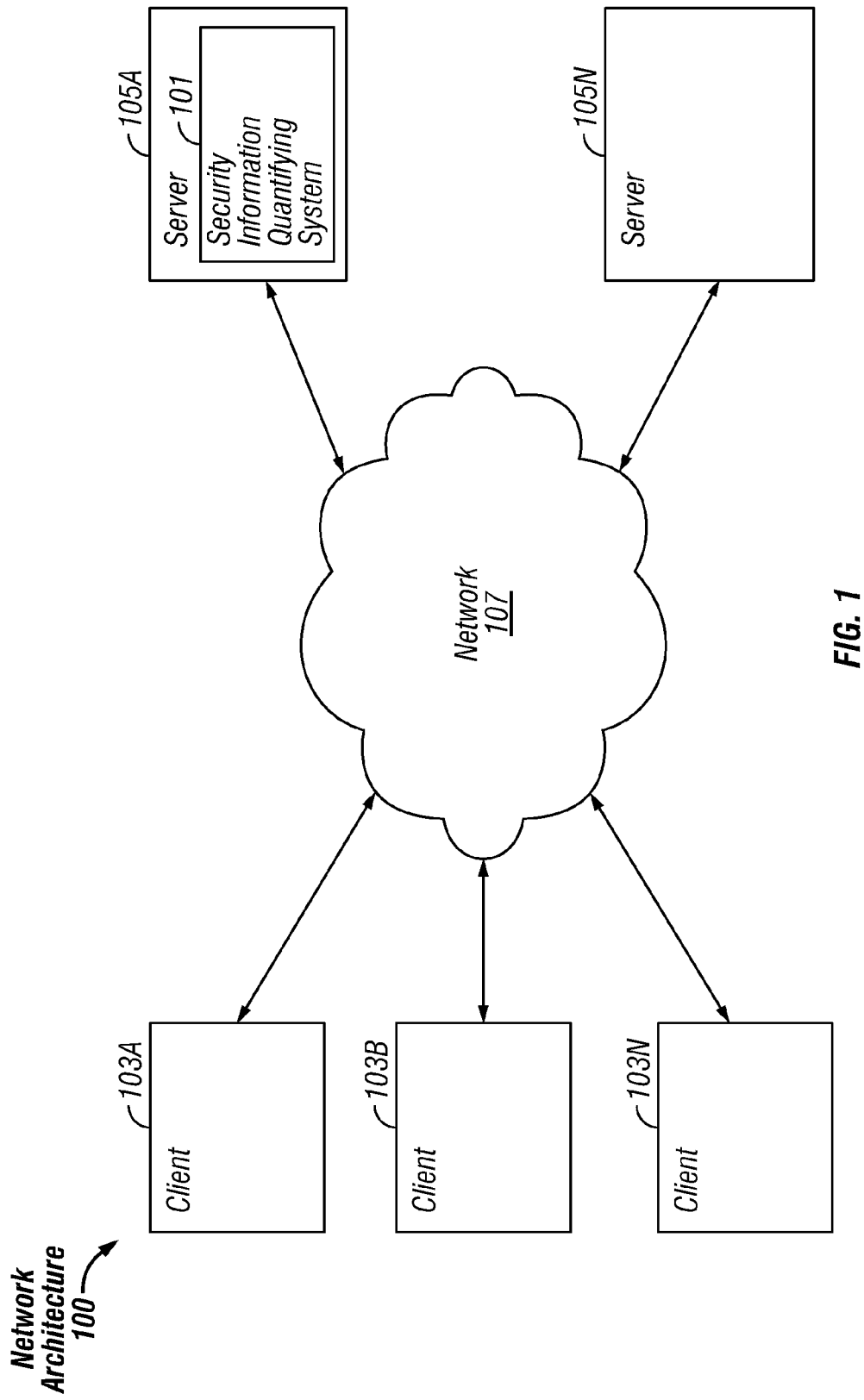
FIG. 1 is a block diagram of an exemplary network architecture in which a security information quantifying system can be implemented, according to some embodiments.

FIG. 1 is a block diagram illustrating an exemplary network architecture 100 in which a security information quantifying system 101 can be implemented. The illustrated network architecture 100 comprises multiple clients 103A, 103B and 103N, as well as multiple servers 105A and 105N. In FIG. 1, the security information quantifying system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers, wearable computing devices and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
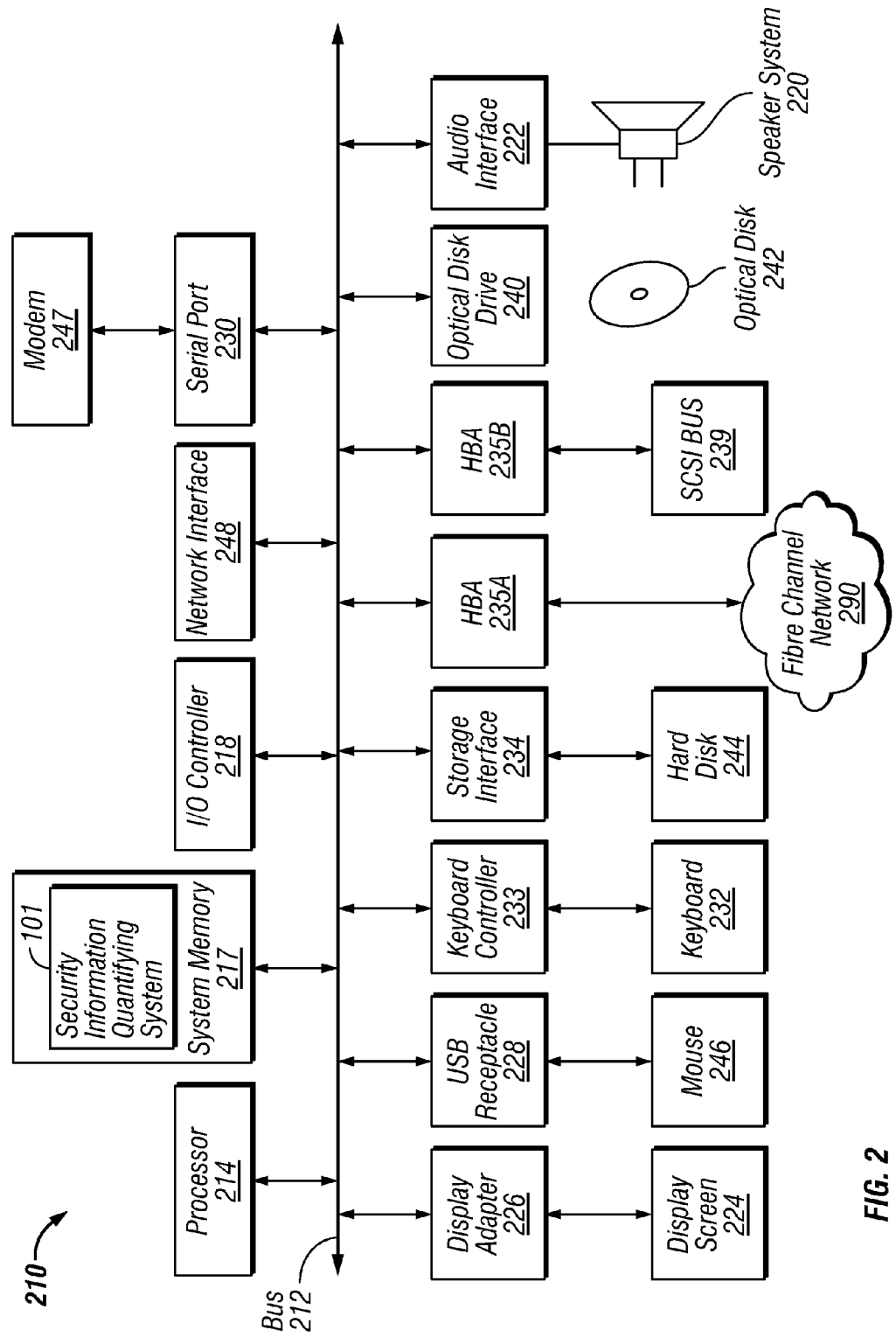
FIG. 2 is a block diagram of a computer system suitable for implementing a security information quantifying system, according to some embodiments.

FIG. 2 is a block diagram of a computer system 210 suitable for implementing a security information quantifying system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the security information quantifying system 101 is illustrated as residing in system memory 217. The workings of the security information quantifying system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
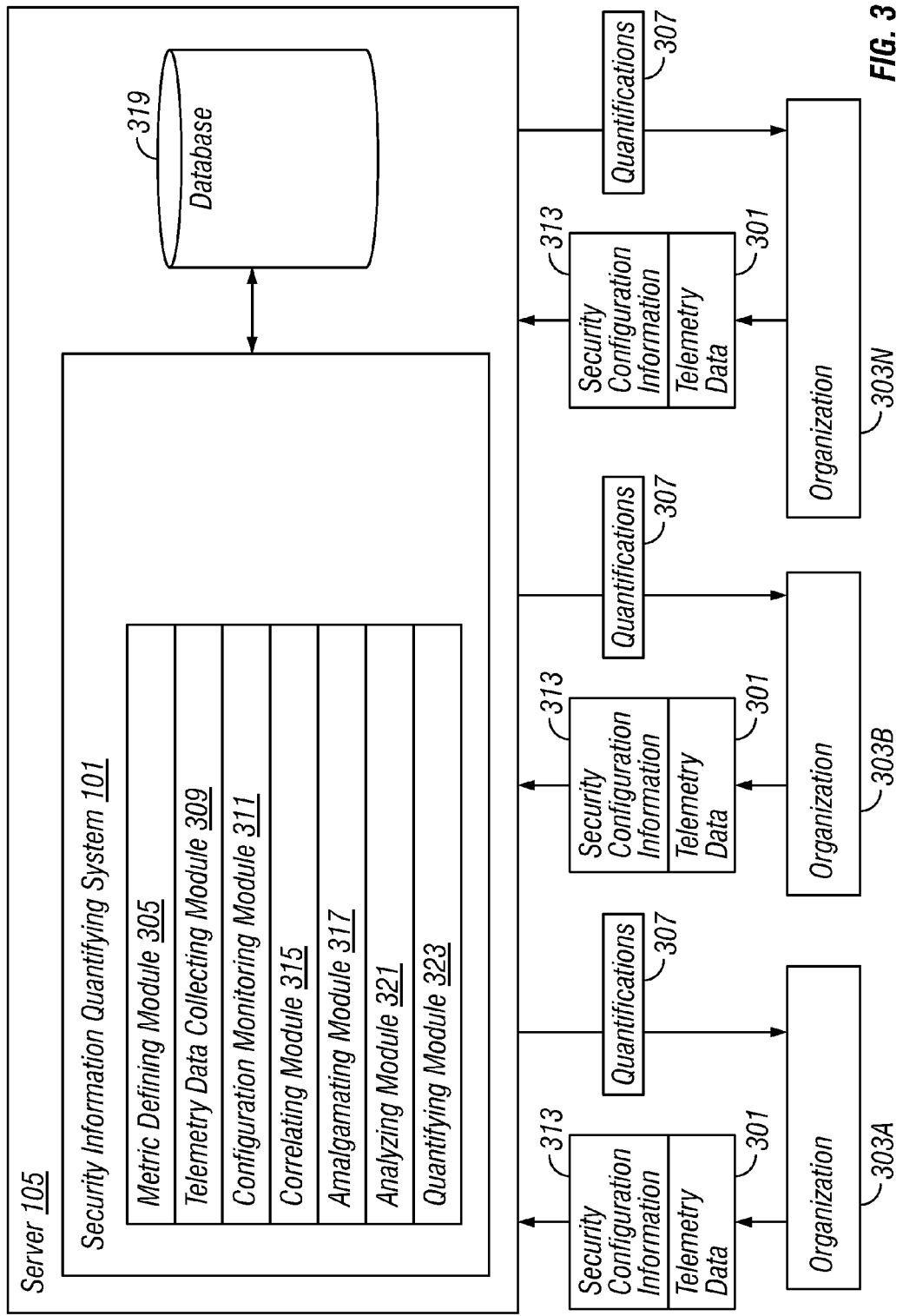
FIG. 3 is a high level block diagram of the operation of a security information quantifying system, according to some embodiments.

FIG. 3 illustrates a security information quantifying system 101 running on a server 105 in the cloud, and being accessed through a network 107 (e.g., the Internet) by computers 210 in multiple organizations 303. As described above, the functionalities of the security information quantifying system 101 can reside on specific computers 210 or be otherwise distributed between multiple computer systems 210, including within a fabric/cloud-based computing environment in which the functionality of the security information quantifying system 101 is provided as a service over a network 107. It is to be understood that although the security information quantifying system 101 is illustrated in FIG. 3 as a single entity, the illustrated security information quantifying system 101 represents a collection of functionalities, which can be instantiated as a single or multiple modules as desired (instantiation of a specific, multiple module security information quantifying system 101 is illustrated in FIG. 3). It is to be understood that the modules of the security information quantifying system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the security information quantifying system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

FIG. 3 illustrates a security information quantifying system 101 running on a server 105, and quantifying the efficacy of security products and practices, based on telemetry data 301 collected from a plurality of computer systems 210. In one embodiment, the security information quantifying system 101 running on a server 105 runs on a central server 105 operated by a security product vendor and communicates with computers 210 of the customer base on which the vendor's security products are installed. In other embodiments, other arrangements are possible, such as the deployment of the security information quantifying system 101 on enterprise level computing infrastructure in communication with multiple computing devices 210 of the enterprise.

In FIG. 3, three computer systems 210 are illustrated communicating with the security information quantifying system 101. It is to be understood that when deployed in the field, the security information quantifying system 101 can interact with orders of magnitude more computers 210 (e.g., hundreds, thousands, hundreds of thousands, etc.). These computers 210 can be in the form of computing devices 210 operated by individual users (e.g., desktop computers, laptop computers, smart phones, tablets, smart watches, smart objects, etc.), and/or at the level of administrated security computing infrastructure operated by organizations 303 (e.g., servers, firewalls, routers, gateways, switches, storage appliances, etc.). As the term is used herein, an organization 303 can be any entity which maintains at least one networked computer 210 with administrated computer security infrastructure. One example of an organization 303 is a corporation or other commercial enterprise that maintains a professionally administrated and secured computer network 107. Universities, government departments and other educational and/or not-for-profit institutions are other examples of organizations 303. An organization 303 can also be in the form of a small business, a private home network 107 or even an individual computer 210 connected to the Internet on which computer security infrastructure is installed (e.g., anti-malware software, a firewall, etc.).

As described in detail below, the security information quantifying system 101 enables the quantification of the efficacy of the various features and settings of different security products. Thus, users and customers can be provided with quantitative information on how to improve their security posture. In the past, users had to simply trust their security vendor that a product deployment was providing value. The security information quantifying system 101 collects and amalgamates large amounts of relevant telemetry data 301 from multiple computers 210 (e.g., from the various organizations 303 making up the customer base). The telemetry data 301 is correlated with the security configuration information 313 and analyzed to quantify the efficacy of deployments, features and configurations. The resulting quantifications 303 can be provided to interested parties such as customers, to help them purchase, deploy, and configure security products. In other words, the security information quantifying system 101 provides quantitative hard data demonstrating the effectiveness of computer security systems at any level of granularity (e.g., per product, per feature, at specific setting levels, efficiency of user, etc.).

More specifically, a metric defining module 305 of the security information quantifying system 101 defines a set of metrics of interest to parties, such as users and/or potential customers of computer security systems. In other words, the metrics defining module 305 defines what criteria concerning computer security systems are to be measured and quantified. The defined metrics can comprise things such as the number of malware infections per computing device 210 (or organization 303, department, etc.) per period of time (e.g., day, month, year); the number of leaked documents per enterprise (or a subgroup) per period of time; the mean time between malware infection and remediation within an organization 303; the number of false positives per specific number (e.g., 10, 100, 1000) of users per period of time, etc. The above examples are measurements of security shortcomings. Defined metrics can also be at level of security successes, such as the number of intrusion attempts blocked per machine 210 per period of time, the number of downloads of infected files prevented, etc. Metrics can also define security related factors to be measured other than direct product effectiveness, such as user time spent administering security products (e.g., how much time an administrator spends using the interface console of a security product). Such metrics can be defined at higher or lower levels of granularity as desired (e.g., any user, specific users, time spent using specific features and/or tools, such as remediating infected files, whitelisting blocked websites, etc.). Metrics can also concern factors such as the frequency with which defaults settings or actions are overridden (e.g., the number of times an administrator has to override a particular setting, or chose something other than the default action in a given circumstance). The set of metrics defines positive and/or negative factors concerning computer security and computer security products to measure and quantify. In some embodiments, the metric defining module 305 defines default metrics. In some embodiments, an administrator or the like can input metrics and/or edit defaults, through a user interface such as a GUI or command line based administrative console. In some embodiments, metrics can be updated dynamically based on factors such as changing security conditions detected in the field or updated marketing information and the like.

A telemetry data collecting module 309 collects telemetry data 301 concerning the defined metrics. This telemetry data 301 is collected from across a plurality of computers 210, such as the customer base of a security product vendor, a subset of the customer base, the computers 210 within a given organization 303 (or department) etc. The telemetry data 301 in question can be in the form of data that explicitly concerns the metrics being quantified, such as incidences of specific attacks being blocked by specific organizations 303, specific malicious code being detected on specific machines 210, etc. The telemetry data 301 can also be implicitly indicative of the metrics in question. For example, in one embodiment all files that arrive on any tracked computing device 210 are monitored (e.g., hashes of the files are taken and provided to the telemetry data collecting module 309). By tracking what files where downloaded to which machines 210 at what times, when a given file is later found to be malicious, the telemetry data collecting module 309 can use the earlier tracked telemetry data 301 concerning file downloads to determine more explicit telemetry 310, such as incidences of infections, times between infection and remediation, etc. The specific telemetry 301 to track is a variable design parameter, and can included any information explicitly or implicitly indicative of the defined metrics. The relationship between the tracked telemetry 301 and the metrics of direct interest can be at any level of complexity.

In some instances, given source organizations 303 and/or or individual computer systems 210 explicitly transmit(s) telemetry 301 to the telemetry data collecting module 309 of the security information quantifying system 101. For example, deployed organization and/or user level security products can be set to transmit this telemetry to a central server 105 maintained by a security product vendor. In other instances, the telemetry data collecting module 309 remotely reads or otherwise gleans this telemetry 301, for example by reading settings within the computer infrastructure of given source organizations 303 or individual computers 210. In these cases, an IT administrator or the like can set the relevant access permissions such that the telemetry data collecting module 309 can read the appropriate data.

Despite the specific route by which telemetry 301 is collected, the telemetry collecting module 309 can obtain (actively or passively) updated telemetry 301 periodically, thereby maintaining current information from the various sources. The frequency at which sources transmit (or at which the telemetry collecting module 309 actively gleans) updated telemetry 301 is a variable design parameter, which can be set as desired according to different scenarios.

As part of telemetry 301, the sources can provide, and the telemetry collecting module 309 collect, various metadata comprising information such as the identity, size, industry, type or other factors describing the source organization 303, times of various events being monitored, information concerning the hardware/software configurations of the source computers 210, etc. The specific format and/or content of the telemetry 301 is a variable design parameter.

In addition to the collection of telemetry 301, a configuration monitoring module 311 of the security information quantifying system 101 monitors current configuration information 313 concerning the deployments and settings of security systems on the multiple sources. In other words, the settings monitoring module 311 monitors what security products are deployed on which machines 210, and how these products are configured (e.g., which options are enabled, which settings are selected, etc.). The settings monitoring module 311 thus tracks security configuration information 313 concerning the various source organizations 303 computing devices 210. As with collected telemetry 301, the configuration information 313 can be transmitted to the configuration monitoring module 311 from the sources, or read from the sources by the configuration monitoring module 311. In either case, the configuration monitoring module 311 receives updated configuration information 313 periodically, thereby monitoring the current state of the various organizations 303 computing devices 210. The frequency at which update configuration information 313 is monitored is a variable design parameter, which can be set as desired according to different scenarios.

The specific configuration information 313 to monitor can vary between embodiments. One possible example is blocking thresholds set by specific sources which deploy a download manager (e.g., organization Alpha deployed a download manager to block downloads from sources with reputations below a specific threshold, whereas organization Beta set the threshold to a specific higher level, etc.). Another possible example is which organizations 303 activate/deactivate a specific heuristic based malicious detection feature. Yet another possible example is percentages of computing devices 210 within specific organizations 303 on which whitelisting is implemented. Of course, these are just non-exhaustive examples. Basically, the settings monitoring module 311 tracks information such as what security products are deployed where, which options and activated, what the settings are, when settings are changed, etc. The tracked configuration information 313 can be at any level of granularity, e.g., per server, client, mobile device, workgroup, enterprise, etc.

As with collected telemetry 301, various metadata can be included with the monitored security configuration information 313, describing the source organizations 303, times of configuration changes, information concerning the hardware/software configurations of the sources, etc. The specific format and/or content of the configuration information 313 is a variable design parameter.

A correlating module 315 of the security information quantifying system 101 correlates collected telemetry 301 with monitored configuration information 313, and determines what security product deployments and settings are in place (as tracked per the monitored configuration information 313) when specific security incidents, operations and other types of actions (good and bad) occur under given circumstances (as tracked per the collected telemetry 301). The correlating can be performed at any level of granularity depending upon the embodiment specific implementations of the defined metrics, collected telemetry 301 and monitored configuration information 313. The occurrence of the types of security incidents and/or other types of security related activities being measured and quantified (e.g., successful and/or failed attacks, malware infections and remediation thereof, true and false positives generated by a heuristic spam detection engine, time spent interfacing with product and tweaking settings, etc.) are correlated with the deployment and configuration of security products at the time of occurrence (e.g., which products were installed, what features/options were activated/deactivated, what settings and thresholds were in place, etc.). Note that the security product deployment and configuration information being correlated with the occurrences of security actions to be quantified is not limited to installations on the affected machines 210. For example, the deployment and configuration of security products on servers and/or network appliances within the organization's computing infrastructure is also a factor, as are deployments in the cloud (e.g., third party hosted security services), deployment's on computing devices used by customers of the organization 303 (e.g., mobile devices), etc. The level of granularity is variable both regarding the specificity of the security occurrences being measured and regarding the specificity of both the security configuration information 313 and any other circumstantial information concerning the affected machines 210 (e.g., installed operating system, organization/department/workgroup in which the affected computer 210 is deployed, etc.). As telemetry 301 is tracked and configuration information 313 is monitored over time, the correlating module 315 continues to perform correlations, thereby automatically maintaining current determinations of what security product deployments and settings are in place when measured security incidents and/or other security related activities occur.

An amalgamating module 317 of the security information quantifying system 101 amalgamates the determined correlations. This has the effect of maintaining a current collection of correlation information concerning what security product deployments and settings are in place under what circumstances as multiple measured security incidents and/or other security related activities occur on multiple computer systems 210 over time. A database 319 or other suitable information storage mechanism can be used to store and maintain the amalgamated correlation information.

An analyzing module 321 of the security information quantifying system 101 analyzes the amalgamated correlation information concerning the deployments, system settings and other circumstances under which security incidents and/or other security related activities occur. Based on the ongoing analysis of this correlation information as computer security products are deployed on different monitored computer systems 210 and the settings and configurations are adjusted and modified, a quantifying module 323 of the security information quantifying system 101 quantifies the efficacy of specific security products and configurations thereof. These quantifications 307 can be at any level of granularity, based on the defined metrics. As security configuration information 313 changes over time (e.g., specific products are deployed and various features are turned on and off, settings adjusted up and down, etc.), the updates are monitored as described above and correlated with tracked security incidents and/or other security related activities being measured. Thus, over time the database 319 of amalgamated correlation information grows. Based on observed increases and decreases in measured security events as changes occur in specific security configuration information 313 over time across the measured installation base, the quantifying module 323 quantifies the effectiveness of specific security products and the settings, features and configurations thereof. The specific format of the quantifications 307 (e.g., numerical on a scale, a percentage, a letter rating etc.) is a variable design parameter.

Quantifications 307 can be per any collection of multiple computers 210. In one embodiment, a security product vendor's entire install base is used in this capacity. In other embodiments, the analyzing of the amalgamated information can further include, for example, categorizing correlations based on the industry of the source organization 303 on which incidents/activities occurred (e.g., software, electronics, financial services, retailing, automotive, etc.). The industry of the organization 303 can be gleaned from the telemetry 301, in which it can be embedded explicitly, or from which it can be implicitly determined (e.g., from the name of organization 303, from the IP address from which the transmission originates, etc.). In other embodiments, information can be categorized based on the organization type from which it originated (e.g., publically traded corporation, privately held start-up, educational institution, government, home network, etc.) or the size thereof (e.g., more than 5000 computers, fewer than 100, individual user). Quantifications 307 can thus be made at the level of specific organization 303, department or even individual, type, size or industry of organization 303, etc.

Once quantifications 307 are calculated, the quantifications 307 can be utilized in a number of ways. In some embodiments, quantifications 307 are used to make recommendations to security product users concerning changes to be made to their current settings, configurations, deployments and the like, backed up by specific hard data. For example, quantified recommendations can be provided to specific users or organizations 303. This can take the form of transmitting alerts recommending to implement specific security practices/deploy specific products, along with quantified information describing the efficacy of taking the recommendations. Such recommendations can be transmitted to, for example, an IT administrator or the like, or to a software system installed on the target computer 210 which can in turn alert the responsible party, for example through a graphical administrative console or other user interface. The specific content of quantified recommendations can vary between embodiments based on factors such as the determined metrics and quantification formats. Some examples could be along the lines of 1) "You have the blocking threshold for your download manager set to 5/10. If you were to set the blocking threshold to 7/10 you would experience 22% fewer infections on the computing devices of your organization per month, and reduce your mean remediation time by 15%"; 2) "You have disabled the heuristic malware detection engine on the computing devices of your organization. If you were to enable this feature you could reduce the number of successful infections by 40%, and would experience no more than one false alarm per 100 users per year"; or 3) "You are currently running antivirus software from vendor X on your computing devices. If you replaced vendor X's antivirus software with that of vendor Y with the default settings, you would experience 53% fewer infections per 100 users per year, eliminating 360 remediation hours." Of course, these are just examples of the types of quantified recommendations that can be made.

The targeting of recipients can be an any level of specificity, e.g., the analysis of the amalgamated information can be used to identify specific users, groups, divisions, corporate policies, etc., that are more and less subject to specific incidents/activities over time, and quantified recommendations can be made to the responsible parties to adjust their security configurations more and less aggressively accordingly.

Another use case for the calculated quantifications 307 is as a marketing/sales tool. Conventionally, computer security products are sold and configured using a qualitative approach rather than a quantitative approach, making it difficult to justify security investment to the customer. The security information quantifying system 101 can provide quantifications 307 of the efficacy of security products and specific features thereof to members of a sales force and/or marketing team (e.g., through a graphical user interface/administrative counsel of a software sales tool). This approach provides actionable intelligence to aid in the marketing, sales and configuration of security products for maximum efficacy.

Another example use case is for the providers of computer security insurance (e.g., insurance against data loss or business downtime due to security breaches, malicious computer activity, etc.). Conventionally, companies that provide such insurance lack quantitative data to use as input for actuarial calculations, deciding whether to write policies and setting rates. Using quantifications 307 provided by the security information quantifying system 101, such companies can write policies, set rates, etc., based on the quantification of the security product configuration of the insured party, also allowing insurance purchasers to improve their configurations to be eligible for more favorable rates. These are simply examples of possible use cases for the quantifications 307 calculated and provided by the security information quantifying system 101. Many other specific uses are also possible.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:
1. A computer implemented method for quantifying the efficacy of security products and practices, based on monitored activities and conditions on a plurality of computing devices over time, the method comprising the steps of:

defining a set of metrics, the defined metrics specifying that specify what criteria concerning computer security systems are to be quantified;

collecting telemetry data concerning the defined metrics from different ones of the plurality of computing devices;

monitoring security configuration information concerning what security products are deployed on which different ones of the plurality of computing devices and/or how the deployed security products are configured and used;

correlating collected telemetry data with monitored configuration information, enabling determination of what security product deployments and settings are in place when specific security incidents, operations and other types of actions occur on specific ones of the plurality of computing devices;

amalgamating correlations of telemetry data with security configuration information;

analyzing the amalgamated correlations of telemetry data with security configuration information; and quantifying efficacy of specific security products and configurations, based on analyzing the analysis of the amalgamated correlations of telemetry data with security configuration information.

2. The method of claim 1 wherein defining metrics further comprises:
defining metrics that measure occurrence of negative security incidents per period of time.

3. The method of claim 1 wherein defining metrics further comprises:
defining metrics that measure occurrence of positive security incidents per period of time.

4. The method of claim 1 wherein defining metrics further comprises:
defining metrics that measure time spent administering specific security products.

5. The method of claim 1 wherein defining metrics further comprises:
defining metrics that measure frequency with which default settings of specific security products are overridden.

6. The method of claim 1 wherein collecting telemetry data concerning defined metrics further comprises:
collecting information concerning occurrence of specific security incidents on specific ones of the plurality of computing devices.

7. The method of claim 1 wherein collecting telemetry data concerning defined metrics further comprises:
collecting information implicitly indicative of at least one defined metric.

8. The method of claim 1 wherein collecting telemetry data concerning defined metrics further comprises:
collecting metadata concerning sources from which collected telemetry data originates.

9. The method of claim 1 wherein monitoring security configuration information concerning different ones of the plurality of computing devices further comprises:
monitoring what security products are deployed on which specific ones of the plurality of computing devices.

10. The method of claim 1 wherein monitoring security configuration information concerning different ones of the plurality of computing devices further comprises:
monitoring configurations of security products deployed on specific ones of the plurality of computing devices.

11. The method of claim 1 further comprising:
receiving, by a central computer, telemetry data and/or security configuration information explicitly transmitted to the central computer by specific ones of the plurality of computing devices.

12. The method of claim 1 further comprising:
reading, by a central computer, telemetry data and/or security configuration information corresponding to specific ones of the plurality of computing devices.

13. The method of claim 1 further comprising:
receiving, by a central computer, updated telemetry data and/or security configuration information from computing devices of the plurality of computing devices over time.

14. The method of claim 1 wherein correlating collected telemetry data with monitored configuration information further comprises:
correlating occurrences of specific types of security incidents with deployments and configurations of specific security products on computing devices at times of the occurrences.

15. The method of claim 1 wherein correlating collected telemetry data with monitored configuration information further comprises:
correlating an occurrence of a specific security incident on a first computing device with deployment and configuration of a specific security product on a second computing device at time of the occurrence.

16. The method of claim 1 wherein amalgamating correlations of telemetry data with security configuration information further comprises:
maintaining a current collection of correlation information concerning what security product deployments and settings are in place as measured security incidents occur on multiple computing devices over time.

17. The method of claim 1 further comprising:
transmitting recommendations to users concerning security product usage, based on quantified efficacy of specific security products and configurations.

18. The method of claim 1 wherein quantifying efficacy of specific security products and configurations further comprises:
quantifying efficacy of specific security products and configurations on computing devices of at least one of: an install base of a security product vendor, a specific organization, a type of organization, a size of organization and a specific industry.

19. At least one non-transitory computer readable medium for quantifying the efficacy of security products and practices, based on monitored activities and conditions on a plurality of computing devices over time, the at least one non-transitory computer readable medium storing computer executable instructions that, when loaded into computer memory and executed by at least one processor of at least one computing device, cause the at least one computing device to perform the following steps:

defining metrics that specify what criteria concerning computer security systems are to be quantified;

collecting telemetry data concerning defined metrics from different ones of the plurality of computing devices;

monitoring security configuration information concerning different ones of the plurality of computing devices;

correlating collected telemetry data with monitored configuration information, enabling determination of what security product deployments and settings are in place when specific security actions occur on specific ones of the plurality of computing devices;

amalgamating correlations of telemetry data with security configuration information;

analyzing the amalgamated correlations of telemetry data with security configuration information; and quantifying efficacy of specific security products and configurations, based on the analysis of the amalgamated correlations of telemetry data with security configuration information.

20. A computer system for quantifying the efficacy of security products and practices, based on monitored activities and conditions on a plurality of computing devices over time, the computer system comprising:

at least one processor;

system memory;

a metric defining module residing in the system memory, the metric defining module being programmed to define metrics that specify what criteria concerning computer security systems are to be quantified;

a telemetry data collecting module residing in the system memory, the telemetry data collecting module being programmed to collect telemetry data concerning defined metrics from different ones of the plurality of computing devices;

a configuration monitoring module residing in the system memory, the configuration monitoring module being programmed to monitor security configuration information concerning different ones of the plurality of computing devices;

a correlating module residing in the system memory, the correlating module being programmed to correlate collected telemetry data with monitored configuration information, enabling determination of what security product deployments and settings are in place when specific security actions occur on specific ones of the plurality of computing devices;

an amalgamating module residing in the system memory, the amalgamating module being programmed to amalgamate correlations of telemetry data with security configuration information;

an analyzing module residing in the system memory, the analyzing module being programmed to analyze the amalgamated correlations of telemetry data with security configuration information; and a quantifying module residing in the system memory, the quantifying module being programmed to quantify efficacy of specific security products and configurations, based on the analysis of the amalgamated correlations of telemetry data with security configuration information.

\* \* \* \* \*